United States Patent
Lahti et al.

Patent Number: 5,835,944
Date of Patent: Nov. 10, 1998

[54] METHOD FOR STORING, TRANSFERRING DECOMPRESSING AND RECONSTRUCTING WAVE TABLE AUDIO SAMPLE

[75] Inventors: Gregg D. Lahti, Chandler; Gary D. Hicok, Mesa; Scott E. Harrow, Scottsdale, all of Ariz.

[73] Assignee: VLSI Technology, Inc., San Jose, Calif.

[21] Appl. No.: 987,576

[22] Filed: Dec. 9, 1997

Related U.S. Application Data

[63] Continuation of Ser. No. 613,261, Mar. 8, 1996.
[51] Int. Cl.$^6$ .................................................. G06F 12/00
[52] U.S. Cl. ........................ 711/118; 364/400.01; 84/604
[58] Field of Search ...................... 711/118; 364/400.01; 84/604; 704/200

[56] References Cited

U.S. PATENT DOCUMENTS

| | | | |
|---|---|---|---|
| 3,976,978 | 8/1976 | Patterson et al. | 711/208 |
| 4,914,577 | 4/1990 | Stewart et al. | 711/207 |
| 5,329,630 | 7/1994 | Baldwin | 711/173 |
| 5,384,850 | 1/1995 | Anderson et al. | 704/200 |
| 5,442,789 | 8/1995 | Bauer | 395/675 |
| 5,589,830 | 12/1996 | Linz et al. | 341/110 |

*Primary Examiner*—Tod R. Swann
*Assistant Examiner*—David Laugjahr
*Attorney, Agent, or Firm*—Harry M. Weiss; Jeffrey D. Moy; Harry M. Weiss & Associates, P.C.

[57] ABSTRACT

A method for storing and transferring wave table audio samples from system memory to a cache unit. The method creates a linked-list of pages in system memory for storing the audio sample. The linked-list is actually a pointer list indicating the locations in system memory where the audio samples are stored. A Digital Signal Processor (DSP) is able to translate the starting address of the pointer list to retrieve a requested audio sample from the system memory. The requested audio sample is then transferred to the cache unit where the DSP is able to retrieve audio samples in a linear fashion at a rate much faster than individually fetching the required portions of the audio sample from the main memory of the system.

1 Claim, 1 Drawing Sheet

METHOD FOR STORING, TRANSFERRING DECOMPRESSING AND RECONSTRUCTING WAVE TABLE AUDIO SAMPLE

RELATED APPLICATIONS

This is a continuation of application Ser. No. 08/613,261, filed Mar. 8, 1996, and claims the benefit of the earlier filing date thereof. This application is related to the applications entitled "SYSTEM FOR REDUCING ACCESS TIMES FOR RETRIEVING AUDIO SAMPLES AND METHOD THEREFOR", U.S. patent application 08/613,148, filed Mar. 8, 1996 and "A SYSTEM AND METHOD FOR THE DECOMPRESSION AND RECONSTRUCTION OF WAVE TABLE AUDIO SAMPLES", U.S. patent application Ser. No. 08/613,151, filed Mar. 8, 1996 filed concurrently herewith, in the name of the same inventors, and assigned to the same assignee as this Application. The disclosures of the above referenced application are hereby incorporated by reference into this application.

BACKGROUND OF THE INVENTION

1. Field of the Invention

This invention relates generally to wave table audio samples and, more specifically, to a method for storing and transferring wave table audio samples.

2. Background of the Invention

Wave tables audio samples (hereinafter audio samples) are used by Digital Signal Processors (DSPs) for use in audio applications to create sounds based upon the audio samples stored in the system. Storing the audio samples to be used by the DSP may be done in the operating system memory or in a Programmable Read Only Memory (PROM).

The DSP will know in a linear fashion where the audio samples are stored. Therefore, the DSP will want to request up to a 1 MB space in the system memory for storing the audio sample. However, a problem may arise since trying to allocate a 1 MB linear space in the system memory may not be possible for many operating systems such as Disk Operating Systems (DOS) or MICROSOFT WINDOWS.

Therefore, a need existed to provide an improved method for storing and transferring wave table audio samples. The improved method must be able to request and allocate sufficient memory space in the system memory for storing the audio samples. The improved method must also be able to transfer the audio sample from the system memory to a wave table cache in an efficient manner so that the DSP may be able to use the audio sample in creating sounds based on the requested audio sample.

SUMMARY OF THE INVENTION

In accordance with one embodiment of the present invention, it is an object of the present invention to provide an improved method for storing and transferring wave table audio samples.

It is another object of the present invention to provide an improved method for storing and transferring wave table audio samples that is able to request and allocate sufficient memory space in the system memory for storing the audio samples.

It is still another object of the present invention to provide an improved method for storing and transferring wave table audio samples that is able to transfer the audio sample from the system memory to a wave table cache in an efficient manner so that the DSP may be able to use the audio sample in creating sounds based on the requested audio sample.

BRIEF DESCRIPTION OF THE PREFERRED EMBODIMENTS

In accordance with one embodiment of the present invention, a method for storing and transferring a wave table audio sample is disclosed. The method comprises the steps of: providing a digital signal processor (DSP) cache management system; allocating memory spaces in a system memory of the DSP cache management system for storing the wave table audio sample by requesting pages in a system memory of said DSP cache management system; loading the memory spaces with the wave table audio sample by a software means; and transferring a portion of the wave table audio sample stored in the memory spaces to a wave table cache of the DSP cache management system. The step of allocating memory spaces in a system memory of the DSP cache management system may further comprise the steps of: creating a linked-list of addresses of the pages in the system memory for storing the wave table audio sample; storing the addresses of the pages into a section of the system memory; writing a starting address of the section of the system memory; storing the addresses of the pages to a base register; programming a cache register with a wave table cache address where the wave table audio sample is to be transferred; and programming a transfer size register with a size of the wave table audio sample to be transferred. The step of transferring the contents stored in the memory spaces may further comprise the steps of: retrieving, by using a DSP of the DSP cache management system, the starting address of the section of the system memory storing the addresses of the pages to a base register; initializing a byte counter; comparing the byte counter to the transfer size stored in the transfer size register; and transferring at least a portion of the wave table audio sample stored in the linked-list of addresses of the pages in the system memory and pointed to by the section of the system memory storing the addresses of the pages until the byte counter is equal to the transfer size stored in the transfer size register.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 2:
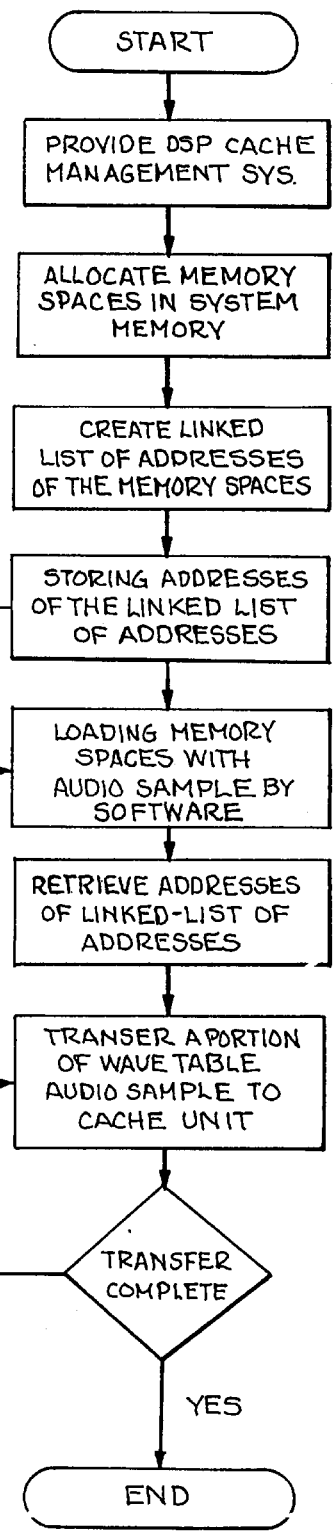
FIG. 2 is a flow diagram depicting the method of the present invention for storing and transferring a wave table audio sample.

Referring to FIG. 2, a flow diagram depicting the steps involved for storing and transferring wave table audio samples is shown. The first step of the method requires the providing of a Digital Signal Processor (DSP) cache management system.

Figure 1:
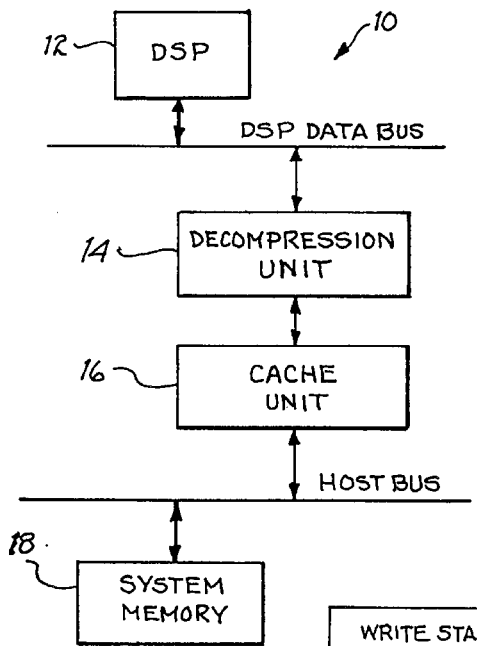
FIG. 1 is a simplified functional block diagram of a system for storing and transferring wave table audio samples.

Referring to FIG. 1, a DSP cache management system 10 (hereinafter system 10) is shown. The system 10 is comprised of a DSP 12, a decompression unit 14, a cache unit 16, and a system memory 18. The DSP 12 is used for generating signals which are used to create sounds based upon requested audio samples by the DSP 12. The audio samples are generally stored in the system memory 18. The system memory can be the operating system memory or a programmable read only memory (PROM). A cache unit 16 is coupled between the DSP 12 and the system memory 18. The cache unit 16 is used for providing a wave table cache for storing audio samples and transferring in a linear fashion the requested audio samples to the DSP 12. In order to preserve the system memory 18 (i.e., to use as little of system memory 18 as possible), the audio samples may be compressed prior to being stored in the system memory 18. Thus, a decompression unit 14 may be required in order for the DSP 12 to be able to use the audio samples. The decompression unit 14 is coupled between the DSP 12 and the cache unit 16. The decompression unit 14 is used for decompressing and reconstructing the compressed audio samples which are requested by the DSP 12.

A more detailed description of the system 10 may be found in the patent applications entitled "SYSTEM FOR REDUCING ACCESS TIMES FOR RETRIEVING AUDIO SAMPLES AND METHOD THEREFOR" and "A SYSTEM AND METHOD FOR THE DECOMPRESSION AND RECONSTRUCTION OF WAVE TABLE AUDIO SAMPLES." Both of these patent applications are filed concurrently herewith, in the name of the same inventors, and assigned to the same assignee as this Application. The disclosures of the above referenced application are hereby incorporated by reference into this application.

OPERATION

Referring back to FIG. 2, a detailed description of the operation of the system 10 (FIG. 1) is shown. In general, in storing audio samples, the DSP 12 (FIG. 1) will know in a linear fashion where the audio samples are stored. The DSP 12 will therefore want to request up to a 1 MB space in system memory 18 (FIG. 1). Trying to allocate a 1 MB linear space in system memory 18 for storing the audio samples may not be possible for many operating systems such as MICROSOFT WINDOWS and Disk Operating Systems (DOS).

Since it may not be possible to allocate a 1 MB linear space in system memory 18, under the present invention, a software driver will request non-continuous pages in system memory 18 and create a linked list into another page. In the preferred embodiment of the present invention, the software driver will allocate the appropriate amount of space in system memory 18 by requesting 4K pages from the operating system. Each address of the 4K pages are saved sequentially into another 4K page with the address of the 4K page containing all of the address pointers to the rest of the pages being stored in a base register. The base register may be stored in the system memory 18 or in the DSP 12. The above steps effectively creates a pointer to a list of pointers for the system 10. The software driver may then load the audio samples into the system memory 18.

When the DSP 12 requires an audio sample, the DSP 12 first determines if the requested audio sample is stored in the cache unit 16. If the requested audio sample is not in the cache unit 16, the request audio sample is transferred from the system memory 18 (or from wherever the requested audio sample is stored) to the cache unit 16.

The transfer of the audio sample from system memory 18 to the cache unit 16 occurs in the following manner. The DSP 12 programs a wave table cache address (WTCA) register with the starting address of the wave table cache space in the cache unit 16 where the audio sample is to be transferred. Since the cache unit 16 may be comprised of a plurality of First-In-First-Out (FIFO) registers, a bit in the WTCA register is used for selecting which FIFO register is to be used. The DSP 12 also programs the size of the audio sample to be transferred into a transfer size (XFRSIZE) register.

The transaction begins when a START bit is written a "1" into the control register. The DSP 12 will then translate the addresses from the base register and address register (the address register storing the starting address of the system memory space for the system 10 to transfer information from). A master read transaction from the system memory 18 to the address in the cache unit 16 pointed to by the WTCA register is then started.

A byte counter is incremented after the master read transaction and is compared to the contents stored in the XFRSIZE register. If the byte counter and the contents stored in the XFRSIZE register are equal, the transfer of the audio sample to the cache unit 16 is complete. However, if the byte counter and the contents stored in the XFRSIZE register are not equal, the DSP 12 begins another transfer sequence and loads another audio sample from the system memory 18 and puts the audio sample into the cache unit 16.

After the transfer sequence is complete, a busy flag is cleared to indicate the completion of the transaction. The decompression unit 14 (FIG. 1) may then decompress the audio sample into a usable code for use by the DSP 12.

While the invention has been particularly shown and described with reference to a preferred embodiment thereof, it should be understood by those skilled in the art that changes in form and detail may be made therein without departing from the spirit and scope of the invention.

What is claimed is:

1. A method for storing and transferring a wave table audio sample comprising the steps of:

providing a digital signal processor (DSP) cache management system;

allocating memory spaces in a system memory of said DSP cache management system for storing said wave table audio sample by requesting pages in a system memory of said DSP cache management system, said step of allocating memory spaces further comprising the steps of:

creating a linked-list of addresses of said pages in said system memory for storing said wave table audio sample;

storing said addresses of said pages into a section of said system memory; and writing a starting address of said section of said system memory storing said addresses of said pages to a base register;

loading said memory spaces with said wave table audio sample by software means; and transferring at least a portion of said wave table audio sample stored in said memory spaces to a wave table cache of said DSP cache management system;

said step of providing a DSP cache management system
   further comprises the steps of:
   providing digital signal processor (DSP) means for
      generating signals which are used to create sounds
      based upon said wave table audio samples stored in
      said system;
   providing system memory means coupled to said DSP
      means for storing said wave table audio samples;
   providing cache means coupled to said DSP means and
      said system memory means for providing a wave
      table cache for storing said wave table audio samples
      and transferring in a linear fashion to said DSP
      means requested wave table audio samples; and
   providing decompression means coupled to said DSP
      means and said cache means for decompressing and
      reconstructing compressed wave table audio
      samples.

* * * * *